United States Patent
Lutjen et al.

(10) Patent No.: US 10,428,953 B2
(45) Date of Patent: Oct. 1, 2019

(54) C-SEAL BACKED BRUSH SEAL WITH A COMPRESSIBLE CORE

(71) Applicant: United Technologies Corporation, Hartford, CT (US)

(72) Inventors: Paul M. Lutjen, Kennebunkport, ME (US); Jose R. Paulino, Saco, ME (US)

(73) Assignee: United Technologies Corporation, Farmington, CT (US)

( * ) Notice: Subject to any disclaimer, the term of this patent is extended or adjusted under 35 U.S.C. 154(b) by 38 days.

(21) Appl. No.: 15/053,613

(22) Filed: Feb. 25, 2016

(65) Prior Publication Data

US 2017/0248234 A1    Aug. 31, 2017

(51) Int. Cl.

| F16J 15/3288 | (2016.01) |
|---|---|
| F01D 11/00 | (2006.01) |
| F01D 11/08 | (2006.01) |
| F04D 29/08 | (2006.01) |
| F16J 15/328 | (2016.01) |

(52) U.S. Cl.
CPC ......... *F16J 15/3288* (2013.01); *F01D 11/003* (2013.01); *F01D 11/005* (2013.01); *F01D 11/08* (2013.01); *F04D 29/083* (2013.01); *F16J 15/328* (2013.01); *F05D 2220/32* (2013.01); *F05D 2230/20* (2013.01); *F05D 2240/56* (2013.01); *F05D 2240/80* (2013.01)

(58) Field of Classification Search
CPC .... F16J 15/3288; F16J 15/328; F01D 11/003; F01D 11/005; F01D 11/08; F04D 29/083; F05D 2220/32; F05D 2230/56; F05D 2240/56; F05D 2240/80; F05D 2230/20

USPC ........................................................ 277/355
See application file for complete search history.

(56) References Cited

U.S. PATENT DOCUMENTS

| 2,932,051 A | 4/1960 | Mertes |
|---|---|---|
| 4,441,726 A * | 4/1984 | Uhl ..................... F16J 15/0812 277/637 |
| 4,678,113 A | 7/1987 | Bridges |
| 4,730,876 A * | 3/1988 | Werner ................... A46D 3/05 140/92.2 |

(Continued)

FOREIGN PATENT DOCUMENTS

| DE | 10351583 | 6/2005 |
|---|---|---|
| GB | 2033026 | 5/1980 |

(Continued)

OTHER PUBLICATIONS

Extended EP Search Report for EP Appln. No. 17157463.5 dated Aug. 7, 2017.

(Continued)

*Primary Examiner* — Nathan Cumar
(74) *Attorney, Agent, or Firm* — O'Shea Getz P.C.

(57) ABSTRACT

Aspects of the disclosure are directed to a brush seal assembly, comprising a compressible core, at least one wire wound around the core, and a backing plate that is substantially 'c' shaped or 'u' shaped that at least partially encases the at least one wire. Aspects of the disclosure are directed to a method comprising separating compressible cores with a spacer, winding wires around the cores and the spacer, and forming substantially 'c' shaped or 'u' shaped backings about the wires to obtain a package of brush seal assemblies.

17 Claims, 4 Drawing Sheets

(56) References Cited

U.S. PATENT DOCUMENTS

| | | | | |
|---|---|---|---|---|
| 5,096,210 | A * | 3/1992 | Wood | C10B 25/20 |
| | | | | 202/251 |
| 5,114,159 | A | 5/1992 | Baird | |
| 5,181,728 | A | 1/1993 | Stec | |
| 5,265,412 | A | 11/1993 | Bagepalli | |
| 5,482,637 | A * | 1/1996 | Rao | C10M 111/04 |
| | | | | 508/100 |
| 5,794,938 | A | 8/1998 | Hofner | |
| 5,864,138 | A | 1/1999 | Miyata et al. | |
| 5,927,721 | A | 7/1999 | Schulze | |
| 6,170,831 | B1 * | 1/2001 | Bouchard | F01D 11/005 |
| | | | | 277/355 |
| 6,250,640 | B1 | 6/2001 | Wolfe | |
| 6,302,400 | B1 | 10/2001 | Werner | |
| 6,357,672 | B1 | 3/2002 | Cowan | |
| 6,406,027 | B1 | 6/2002 | Aksit | |
| 6,488,471 | B1 | 12/2002 | Stibich | |
| 6,669,202 | B1 * | 12/2003 | Aksit | F16J 15/3288 |
| | | | | 277/355 |
| 6,695,314 | B1 | 2/2004 | Gail | |
| 7,644,928 | B2 | 1/2010 | Beichl | |
| 8,047,550 | B2 * | 11/2011 | Behrens | E04B 1/948 |
| | | | | 277/630 |
| 8,505,923 | B2 * | 8/2013 | Ferryman | F16J 15/3288 |
| | | | | 277/355 |
| 2004/0100030 | A1 | 5/2004 | Addis | |
| 2005/0116423 | A1 * | 6/2005 | Beichl | F16J 15/3288 |
| | | | | 277/355 |
| 2007/0214628 | A1 | 9/2007 | Adis et al. | |
| 2008/0003099 | A1 | 1/2008 | Giesler | |
| 2008/0284107 | A1 | 11/2008 | Flaherty | |
| 2012/0195741 | A1 | 8/2012 | Sarawate | |
| 2013/0084166 | A1 * | 4/2013 | Klingels | F01D 11/005 |
| | | | | 415/173.1 |
| 2015/0322816 | A1 | 11/2015 | Schmitz | |

FOREIGN PATENT DOCUMENTS

| | | |
|---|---|---|
| GB | 2039314 | 8/1980 |
| KR | 20150144628 | 12/2015 |
| WO | 2014/158589 | 10/2014 |

OTHER PUBLICATIONS

EP Office action for EP Appln. No. 17157463.5 dated Jul. 10, 2019.

* cited by examiner

C-SEAL BACKED BRUSH SEAL WITH A COMPRESSIBLE CORE

BACKGROUND

Seals are used in an aircraft engine to isolate a fluid from one or more areas/regions of the engine. For example, seals are used to control various characteristics (e.g., temperature, pressure) within the areas/regions of the engine and are used to ensure proper/efficient engine operation and stability.

Brush seals are a type of seal used to provide for fluid isolation in the manner described above. A brush seal may be implemented as a bundle of bristles sandwiched between two plates, where the bristles are frequently made of cobalt and the plates are made of nickel. A welding technique, e.g., tungsten inert gas (TIG) welding, electron beam welding (EBW), etc., is applied to form the brush seal from the bristles and the plates. The plates may then be subjected to a finishing technique to remove/add material to accommodate at least one dimension of an application environment where the brush seal is deployed. In this respect, the brush seal that is manufactured is customized/tailored to that particular application environment.

The engine/engine core may have relatively small areas/cavities that need to be sealed. The manufacturing techniques described above become ineffective as the dimensions of the brush seal decrease, as it can be difficult if not impossible to machine the brush seal. Still further, the structural integrity of a conventional brush seal can be compromised if the dimensions of the brush seal are too small.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a brush seal assembly, comprising: a compressible core, at least one wire wound around the core, and a backing plate that is substantially 'c' shaped or 'u' shaped that at least partially encases the at least one wire. In some embodiments, the core includes a rope seal. In some embodiments, the core includes at least one of a ceramic textile or a composite material. In some embodiments, the brush seal assembly includes at least one of metallic bristles or ceramic bristles. In some embodiments, the assembly further comprises a spacer configured to separate the core from a second core. In some embodiments, the assembly further comprises the second core. In some embodiments, the brush seal assembly is configured to be installed in a dove-tail slot. In some embodiments, the dove-tail slot corresponds to a blade outer air seal rail or a vane platform. In some embodiments, the backing plate is formed from sheet metal. In some embodiments, the backing plate is coated.

Aspects of the disclosure are directed to a method comprising: separating compressible cores with a spacer, winding wires around the cores and the spacer, and forming substantially 'c' shaped or 'u' shaped backings about the wires to obtain a package of brush seal assemblies. In some embodiments, the method further comprises removing the spacer. In some embodiments, the method further comprises applying heat to the spacer to remove the spacer. In some embodiments, the method further comprises splitting the package to yield two brush seals, and physically extracting the spacer from each of the two brush seals to remove the spacer. In some embodiments, the method further comprises moving the wires relative to the cores and the spacer when winding the wires. In some embodiments, the method further comprises cutting a brush seal from the package in accordance with at least one dimension where the brush seal is to be installed. In some embodiments, the method further comprises installing the brush seal in a slot corresponding to a blade outer air seal rail or a vane platform. In some embodiments, a brush seal included in the package has a radial dimension that is less than 0.15 inches and an axial dimension that is less than 0.20 inches.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
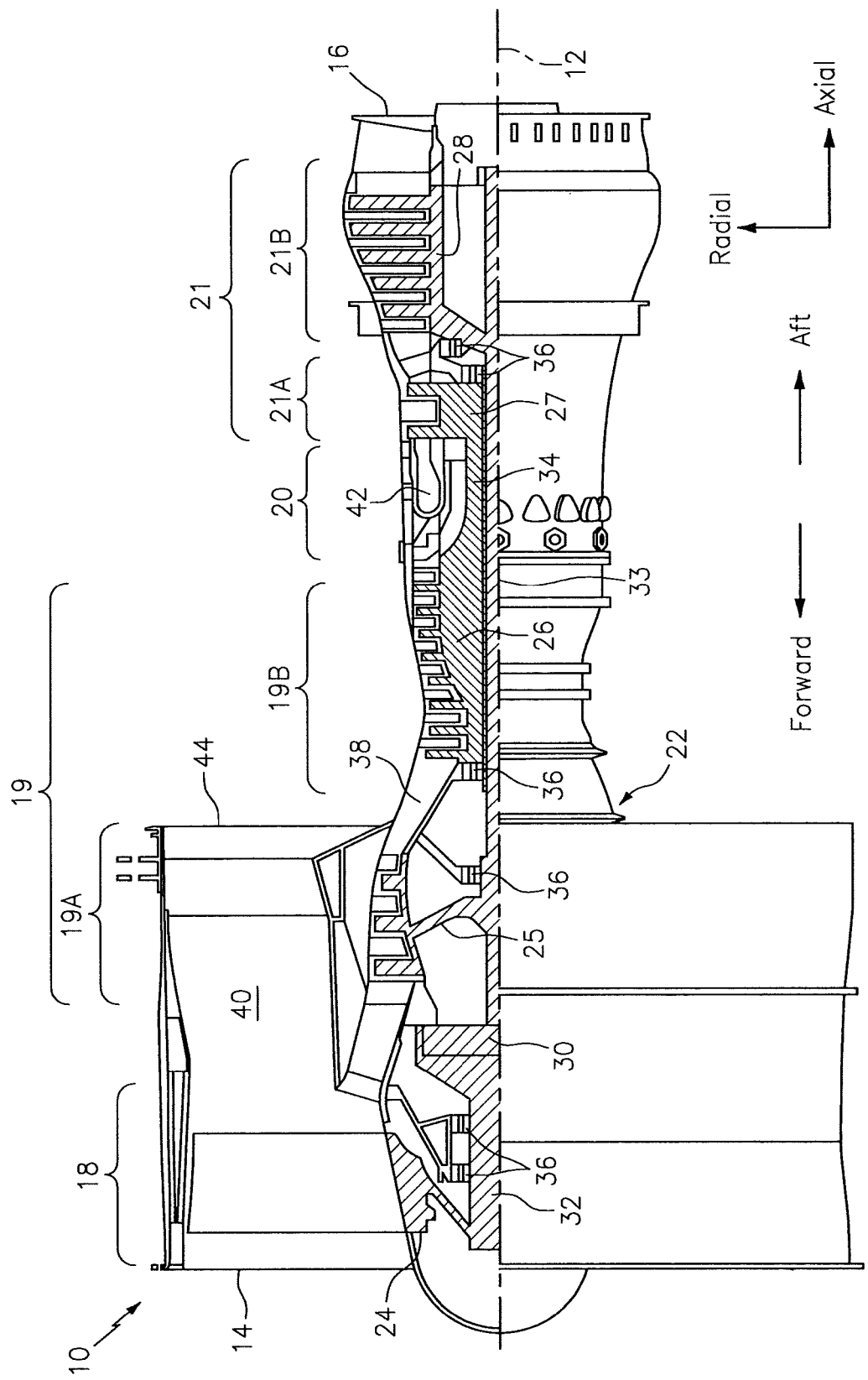
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described in connection with a seal configured for use on an engine. In some embodiments, a brush seal assembly may include a compressible core. The brush seal assembly may include a support/backing made of one or more materials (e.g., metal). The backing may be arranged in accordance with one or more shapes/configurations; e.g., a 'c' shape, a 'u' shape, etc.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines.

Figure 2A:
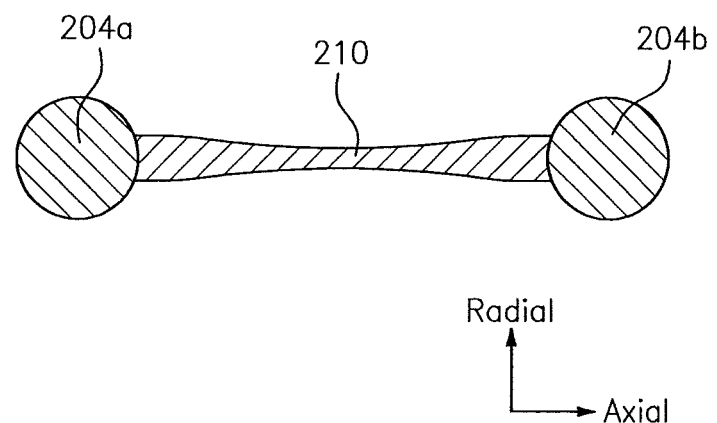
FIGS. 2A-2C illustrate a construction of one or more brush seals.
Figure 2B:
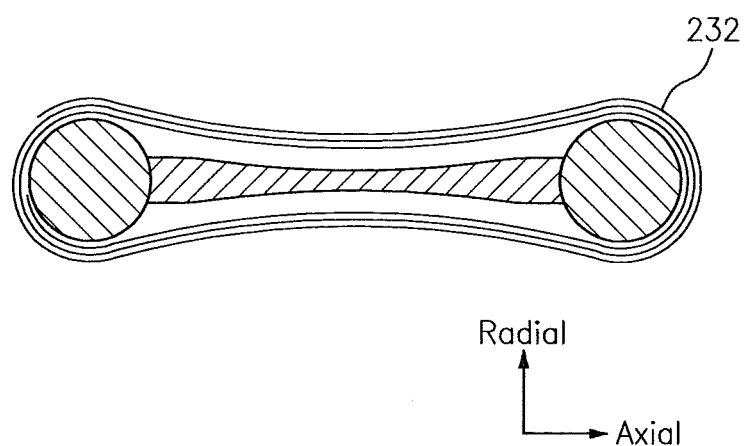
Figure 2C:
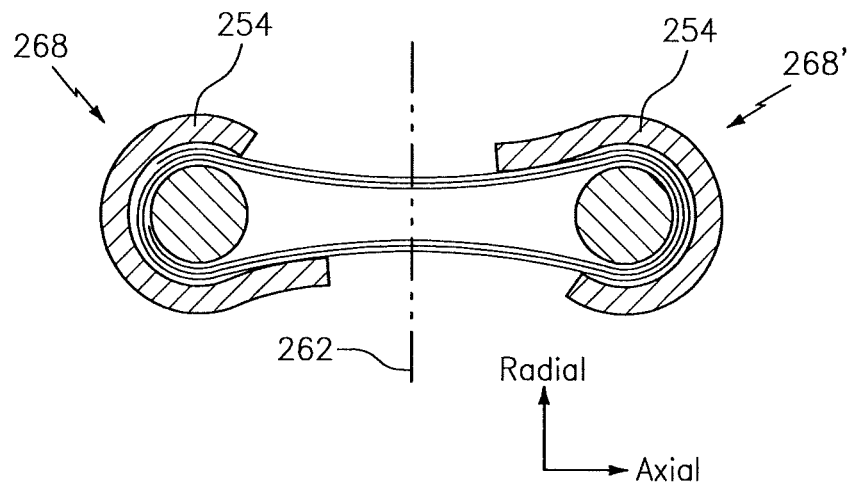

Referring now to FIGS. 2A-2C, a formation of one or more seals is shown. A seal that is formed may be included as part of an engine. The seal may be incorporated as part of one or more sections of the engine, such as for example the compressor section 19 or the turbine section 21 of the engine 10 of FIG. 1.

Referring to FIGS. 2A-2D and 3, a method 300 for making and using one or more seals is shown.

In block 306, and as seen in FIG. 2A, two cores 204a and 204b may be separated from one another. The cores 204a and 204 are shown in FIG. 2A as being separated from one another using a spacer 210. One or both of the cores 204a and 204b may include a rope seal that is leveraged as a spring, where the rope seal may be able to compress on the order of 15% of the rope seal diameter. In some embodiments, one or both of the cores 204a and 204b may include a ceramic textile or a composite material. In some embodiments, one or both of the cores 204a and 204b may include, or be wrapped with, a metallic sheath that can resist abrasion.

In block 312, and as seen in FIG. 2B, one or more wires 232 may be wound around the assembly/package of the cores 204a and 204b and the spacer 210 of FIG. 2A. The winding of the wire(s) 232 in block 312 may form a wound-wire bristle pack. The bristles may include a woven material, a ceramic material, etc. As part of the winding of block 312, the combination of the cores 204a and 204b and the spacer 210 may be made to move relative to the wires 232 to encapsulate/cover a substantial portion, or even all of, the cores 204a and 204b and the spacer 210 with wire 232.

In block 318, and as seen in FIG. 2C, one or more supports/backings/backing plates 254 may be formed about the wire(s) 232 or at least partially enclose/encase the wire(s) 232. The backing(s) 254 may be made of one or more materials; e.g., the backing(s) 254 may be formed from/include sheet metal. The backing(s) 254 may adhere to one or more shapes/configurations; e.g., at least a portion of a backing 254 may be substantially 'c' shaped, 'u' shaped, etc. In some embodiments, at least a portion of a backing 254 may be coated. The coating may provide for wear reduction, a "hard face" or lubricious coating.

In block 324, and as seen in FIG. 2C, the package of block 318 may be split/cut along a line 262, yielding two c-seal backed brush seals 268 and 268'.

In block 330, the spacer 210 may be removed from the assembly/package. The removal may be obtained by melting the spacer 210 (e.g., applying heat to the spacer 210) or by physically extracting the spacer 210 from the two halves 268 and 268'.

Figure 2D:
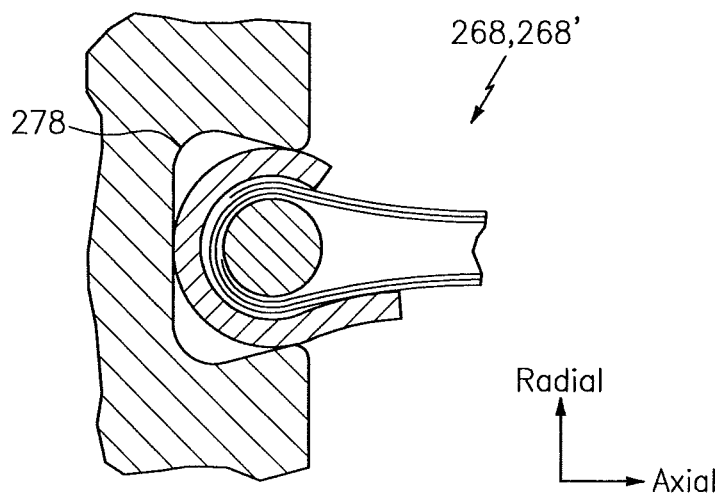
FIG. 2D illustrates an installation of a brush seal in a slot.
Figure 3:
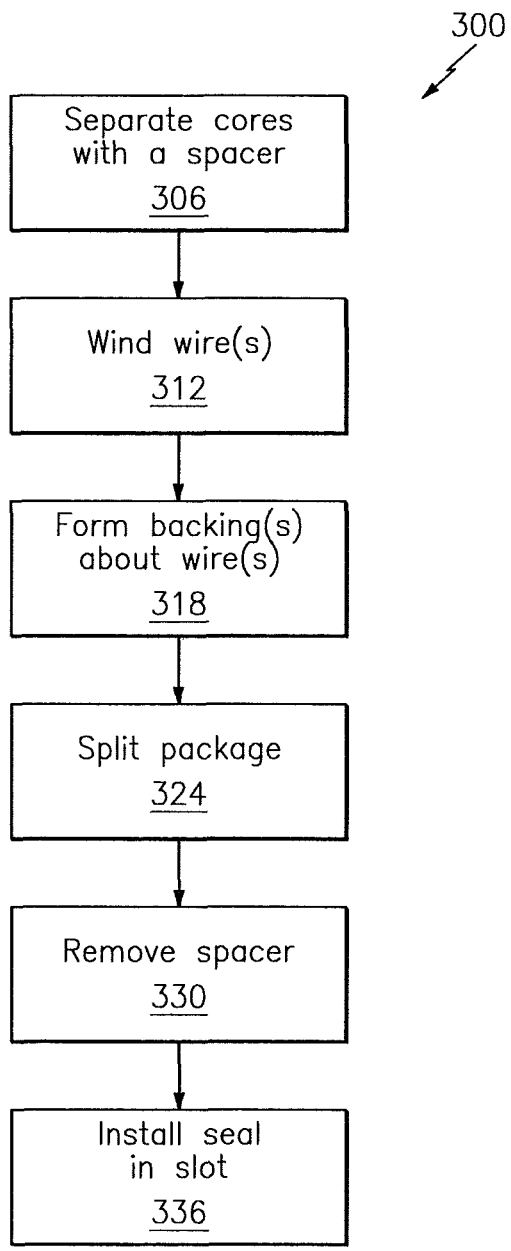
FIG. 3 illustrates a flowchart of a method for fabricating one or more brush seals.

In block 336, and as seen in FIG. 2D, a seal 268, 268' may be installed in a slot 278. The slot 278 may include a dove-tail slot, which may correspond to a blade outer air seal (BOAS) rail, a vane platform, etc. The slot 278 may retain the seal 268, 268' in a compressed state.

The method 300 is illustrative. In some embodiments, one or more of the operations/blocks (or one or more portions thereof) may be optional. In some embodiments, additional blocks now shown may be included. In some embodiments, the blocks may execute in an order/sequence that is different from what is shown in the drawing figures.

While the method 300 was described above as generating/forming two seals (e.g., seals 268 and 268') about the line 262, aspects of the method 300 may be adapted to create any number of brush seals. For example, a spool/package of brush seals may be fabricated, cut to length, and installed as needed. Such techniques may be used to customize a seal in accordance with the application environment (e.g., the dimensions of the environment) where the seal is to be installed/implemented.

Technical effects and benefits of this disclosure include enhanced confidence in the assembly of an engine. In some embodiments, a seal may have a radial dimension of less than about 0.15 inches (approximately 3.8 millimeters) and an axial dimension of as little as about 0.20 inches (approximately 5.1 millimeters). In this respect, aspects of the disclosure may include a seal that is dimensioned to accommodate tighter/smaller spaces relative to conventional seal capabilities; e.g., conventionally seals may consume at least 0.30 inches (approximately 7.6 millimeters) in at least one reference direction. Still further, aspects of the disclosure may provide for a compressible seal, thereby allowing the seal to be installed in a wide range of application environments (e.g., application environments characterized by different dimensions). Such flexibility may be based on the compressible nature of a core and/or a backing/support of the seal. Aspects of the disclosure may enable a seal to be manufactured without having to apply a welding technique (e.g., a weld-free manufacturing procedure), thereby simplifying the manufacturing procedure.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. An assembly, comprising:
   a first compressible core;
   at least one wire wound around the first compressible core;
   a backing plate that is substantially 'c' shaped or 'u' shaped that at least partially encases the at least one wire;
   a second compressible core; and
   a spacer that abuts the first compressible core and the second compressible core and separates the first compressible core from the second compressible core,
   wherein the assembly is configured to be installed in a dove-tail slot, and
   wherein the spacer is configured to be removed from the assembly prior to the assembly being installed in the dove-tail slot, and the spacer comprises a single thinner center section at a middle portion thereof.

2. The assembly of claim 1, wherein the first compressible core includes a rope seal.

3. The assembly of claim 1, wherein the first compressible core includes at least one of a ceramic textile or a composite material.

4. The assembly of claim 1, wherein the brush seal assembly includes at least one of metallic bristles or ceramic bristles.

5. The assembly of claim 1, wherein the dove-tail slot corresponds to a blade outer air seal rail or a vane platform.

6. The assembly of claim 1, wherein the backing plate is formed from sheet metal.

7. The assembly of claim 1, wherein the backing plate is coated.

8. The assembly of claim 1, wherein the first compressible core includes a composite material and the assembly includes ceramic bristles.

9. The assembly of claim 1, wherein the dove-tail slot corresponds to a blade outer air seal rail.

10. The assembly of claim 1, wherein the assembly is weld-free.

11. A method comprising:
    separating compressible cores with a spacer that abuts the first compressible core and the second compressible core and separates the first compressible core from the second compressible core;
    winding wires around the cores and the spacer; and
    forming substantially c' shaped or 'u' shaped backings about the wires to obtain a package of brush seal assemblies,
    wherein the assembly is configured to be installed in a dove-tail slot, and
    wherein the spacer is configured to be removed from the assembly prior to the assembly being installed in the dove-tail slot, and the spacer comprises a single thinner center section at a middle portion thereof.

12. The method of claim 11, further comprising:
    applying heat to the spacer to remove the spacer.

13. The method of claim 11, further comprising:
    splitting the package to yield two brush seals; and
    physically extracting the spacer from each of the two brush seals to remove the spacer.

14. The method of claim 11, further comprising:
    moving the wires relative to the first and second compressible cores and the spacer when winding the wires.

15. The method of claim 11, further comprising:
    cutting a brush seal from the package in accordance with at least one dimension where the brush seal is to be installed.

16. The method of claim 15, further comprising:
    installing the brush seal in a slot corresponding to a blade outer air seal rail or a vane platform.

17. The method of claim 11, wherein a brush seal included in the package has a radial dimension that is less than 0.15 inches and an axial dimension that is less than 0.20 inches.

* * * * *